(12) United States Patent
Spring

(10) Patent No.: US 12,529,864 B2
(45) Date of Patent: Jan. 20, 2026

(54) SPACER FOR AN OPTICAL DEVICE

(71) Applicant: ams Sensors Singapore Pte. Ltd., Singapore (SG)

(72) Inventor: Nicola Spring, Oberterzen (CH)

(73) Assignee: ams-Osram Asia Pacific Pte. Ltd., Singapore (SG)

( * ) Notice: Subject to any disclaimer, the term of this patent is extended or adjusted under 35 U.S.C. 154(b) by 345 days.

(21) Appl. No.: 18/003,477

(22) PCT Filed: Jun. 23, 2021

(86) PCT No.: PCT/SG2021/050365
§ 371 (c)(1),
(2) Date: Dec. 27, 2022

(87) PCT Pub. No.: WO2022/005394
PCT Pub. Date: Jan. 6, 2022

(65) Prior Publication Data
US 2023/0244054 A1    Aug. 3, 2023

(30) Foreign Application Priority Data

Jun. 30, 2020 (GB) ..................................... 2009957

(51) Int. Cl.
*G02B 7/02* (2021.01)

(52) U.S. Cl.
CPC ............. *G02B 7/025* (2013.01); *G02B 7/021* (2013.01)

(58) Field of Classification Search
CPC ...... H10F 39/804; H10F 39/026; H10F 77/50; H01L 23/12; H01L 25/0753; H01L 25/167; G02B 7/025; G02B 7/021; H10H 20/855
See application file for complete search history.

(56) References Cited

U.S. PATENT DOCUMENTS 6,806,992 B2   10/2004   Soneda et al.
8,048,708 B2   11/2011   Borthakur et al.
(Continued)

FOREIGN PATENT DOCUMENTS

CN   103201838 A   7/2013
EP      1369730 A1   12/2003
(Continued)

OTHER PUBLICATIONS

Supplementary European Search Report issued for the corresponding EP patent application No. EP 21833246 dated Jun. 3, 2024, 1 page (for informational purposes only).
(Continued)

*Primary Examiner* — Ephrem Z Mebrahtu
(74) *Attorney, Agent, or Firm* — Viering, Jentschura & Partner mbB

(57) ABSTRACT

A method of manufacturing a spacer (285) for spacing apart and electrically coupling first and second components of an optical device is disclosed. The method comprises a step of adhesively coupling a first substrate (250) to each of a plurality of spacer elements (205). The method comprises a step of adhesively coupling a second substrate (275) to each of the plurality of spacer elements, such that the plurality of spacer elements are disposed between opposing surfaces of the first and second substrates. At least one of the plurality of spacer elements comprises a conductive coating and/or is adhesively coupled to the first and second substrates with an electrically-conductive adhesive, such that an electrically-conductive path (290*a-d*) is formed for electrically coupling the first and second components of the optical device. Also disclosed is an optical device (500) comprising a spacer (285) manufactured according to the method.

18 Claims, 9 Drawing Sheets

(56) References Cited

U.S. PATENT DOCUMENTS

| | | |
|---|---|---|
| 2011/0050979 A1 | 3/2011 | Rudmann |
| 2012/0148190 A1 | 6/2012 | Tamanuki |
| 2013/0162882 A1 | 6/2013 | Rudmann et al. |
| 2014/0049687 A1 | 2/2014 | Rudmann |
| 2015/0036046 A1 | 2/2015 | Rudmann et al. |
| 2018/0196170 A1 | 7/2018 | Tazawa et al. |

FOREIGN PATENT DOCUMENTS

| | | | | |
|---|---|---|---|---|
| JP | H08334777 A | 12/1996 | | |
| JP | 2013050359 A | 3/2013 | | |
| JP | 5837778 B2 | 12/2015 | | |
| WO | 2009076789 A1 | 6/2009 | | |
| WO | 2014085647 A1 | 6/2014 | | |
| WO | WO-2015053706 A1 * | 4/2015 | ....... | H01L 27/14618 |

OTHER PUBLICATIONS

International Search Report and Written Opinion from related PCT Application No. PCT/SG2021/050365, mailed Oct. 1, 2021, 9 pages.
UK Search Report from related priority UK patent application No. 2009957.8, mailed Dec. 17, 2020, 3 pages.
Chinese office action issued for the corresponding Chinese patent application No. 202180045487.3, dated Apr. 24, 2025, 8 pages (for informational purposes only).

\* cited by examiner

SPACER FOR AN OPTICAL DEVICE

CROSS-REFERENCE TO OTHER APPLICATIONS

This application is a United States National Phase Application of International Patent Application Number PCT/SG2021/050365, filed Jun. 23, 2021, entitled "SPACER FOR AN OPTICAL DEVICE", which Application claims priority to United Kingdom patent application Ser. No. 2009957.8, filed on Jun. 30, 2020, the contents of which are incorporated herein by reference in their entirety.

TECHNICAL FIELD OF THE DISCLOSURE

The present disclosure is in the field of optical devices and wafer-level manufacturing of optical devices. In particular, the present disclosure relates to spacers for optical devices.

BACKGROUND OF THE DISCLOSURE

Optical devices, for example devices comprising passive optical components such as lenses and/or active optical components such as radiation sensors and emitters, are prevalent in many optical systems. For example, camera systems such as those implemented on cellular telephones and tablet devices may comprise multiple optical devices.

Such optical devices may be implemented as micro-optical devices, wherein physical dimensions of the devices are minimised for functional, practical and/or cost purposes. Cost-effective and extensively parallelized production methods at a wafer-level may be implemented for manufacturing such micro-optical devices.

Such optical devices may comprise electronic components, or may be required to provide an interface to electronic circuitry. For example, optical sensors may be required to provide signals to measurement circuitry. As such, optical devices may comprise circuitry and/or electronic components.

Furthermore, such optical devices manufactured at a wafer-level may be formed from layered stacks or assemblies of multiple components, which may require electrical connectivity between such components. In some instances, it may be desirable for connectivity between such components to be implemented without obstructing or obscuring optical elements within the device.

Existing techniques for implementing electrical connectivity between components in such micro-optical devices may require intricate geometries of components and complex processes, such as Laser Direct Structuring (LDS) to place electrical connections away from such optical elements. Furthermore, existing manufacturing techniques may result in large optical device sizes, which may detrimentally affect manufacturing costs and efficiencies.

It is therefore desirable to provide compact optical devices which comprise reliable electrical connectivity between components, and/or connectivity to further electronic components. Furthermore, it is desirable to provide a method of manufacturing such an optical device.

It is therefore an aim of at least one embodiment of at least one aspect of the present disclosure to obviate or at least mitigate at least one of the above identified shortcomings of the prior art.

SUMMARY

The present disclosure primarily relates to a method of manufacturing a spacer for spacing apart and electrically coupling first and second components of an optical device. In particular, the optical device may be an optical device suitable for implementation in eye-safety circuits in illuminators for 3D-sensing in smart-phone and automotive applications.

According to a first aspect of the present disclosure, there is provided a method of manufacturing a spacer for spacing apart and electrically coupling first and second components of an optical device, the method comprising the steps of: adhesively coupling a first substrate to each of a plurality of spacer elements; and adhesively coupling a second substrate to each of the plurality of spacer elements, such that the plurality of spacer elements are disposed between opposing surfaces of the first and second substrates, wherein at least one of the plurality of spacer elements comprises a conductive coating and/or is adhesively coupled to the first and second substrates with an electrically-conductive adhesive, such that an electrically-conductive path is formed for electrically coupling the first and second components of the optical device.

Advantageously, the provision of an electrically-conductive path extending between first and second components of the optical device and effectively integrated into the spacer, may enable a compact optical device to be assembled. Such a compact optical device may provide a reliable electrical connection between the first and second components and further components or circuits, via the electrically-conductive path.

Furthermore, by providing a smaller, compact optical device, overall material costs may be reduced. That is, for wafer-level manufacturing of the optical device, a greater quantity of optical devices per wafer may be manufactured due to a reduced footprint of each individual optical device.

Each spacer element may be a bar. Each spacer element may be an elongate element. For example, each spacer element may comprise a substantially cuboid shape. Each spacer element may be formed from a substrate or wafer. For example, a substrate or wafer may be cut or diced into a plurality of spacer elements, using a dicing saw or the like. A plurality of substantially parallel cuts across a substrate or wafer may form the plurality of spacer elements.

In some embodiments, the coating may comprise chromium and/or another metal.

Furthermore, in some embodiments wherein the at least one of the plurality of spacer elements comprises a conductive layer and/or the conductive coating, the adhesive may be a non-conductive adhesive.

At least one surface of each spacer element may be ground and/or polished.

Each spacer element and/or the first and/or second substrate may be formed from an electrically-insulating material.

Each spacer element may be formed from a glass wafer, a silicon wafer, or the like. Each spacer element may comprise a cured epoxy. Each spacer element may comprise polydimethylsiloxane (PDMS).

Each spacer element may be formed from a machined substrate, wafer or plate.

The method may comprise a preceding step of arranging the plurality of spacer elements substantially parallel to one another on a receptacle. The plurality of spacer elements may be arranged to be evenly spaced apart.

For example, the receptacle may be a baseplate, a wafer plate, or the like. The receptacle may comprise a plurality of troughs or grooves, wherein each trough or groove may be sized to accommodate a spacer element of the plurality of spacer elements.

The receptacle may be a chuck. The receptacle may be configured to hold or clamp the plurality of spacer elements. The receptacle may be a vacuum chuck.

The method may comprise a step of adhering a removable adhesive element to the plurality of spacer elements, and subsequently removing the plurality of spacer elements from the receptacle.

The removable adhesive element may comprise a sheet of dicing tape.

The removable adhesive element may comprise double-sided tape, e.g. a tape with adhesive applied to both sides.

A first side of the removable adhesive element may be adhered to a carrier element, such as a baseplate. The method may comprise adhering a second side of the removable adhesive element to the plurality of spacer elements. As such, the carrier element may be used to lift the plurality of spacer elements from the receptacle. Furthermore, the plurality of spacer elements may remain temporarily adhered to the carrier element by the removable adhesive element.

The method may comprise one or more steps of curing the electrically-conductive adhesive to form the electrically-conductive path, e.g. at least a portion of the electrically-conductive path.

The step of curing the electrically-conductive adhesive may cause the electrically-conductive adhesive to solidify. Furthermore, the step of curing the electrically-conductive adhesive may cause the electrically-conductive adhesive to bond, such as rigidly bond, the each of the plurality of spacer elements to the first substrate and/or to the second substrate.

The electrically-conductive adhesive may be an isotropic adhesive.

The step of curing the electrically-conductive adhesive may comprise addition of one or more curatives or hardeners.

The step of curing the electrically-conductive adhesive may comprise thermal and/or UV curing of the electrically-conductive adhesive.

The method may comprise a step of applying a force to the first and/or second substrate when adhesively coupling the first and/or second substrate to the plurality of spacer elements, such that a portion of the electrically-conductive adhesive is pushed or forced from between the first and/or second substrate and the plurality of spacer elements. The portion of the electrically-conductive adhesive may form the conductive path, or may form an extension of the conductive path. Beneficially, the portion of material may increase an overall cross-sectional area of the conductive path, decreasing an overall resistance of the conductive path.

The method may comprise a step of dicing the first substrate, second substrate and plurality of spacer elements to form a plurality of spacers. That is, the method may comprise a step of dicing an assembly comprising the first substrate, second substrate and plurality of spacer elements to form a plurality of spacers.

The step of dicing may comprise using a dicing saw, laser cutter, or the like.

The step of dicing may comprise cutting each spacer element of the plurality of spacer elements into separate parts, each part forming a sidewall of a separate spacer of the plurality of spacers.

Subsequent to the step of dicing, each part forming the sidewall of the separate spacer may be polished.

The method may comprise a step of forming, on at least one of the plurality of spacer elements and/or on the first substrate and/or second substrate, a layer of substantially reflective material.

For example, the reflective material may be reflective to wavelengths of radiation that may be emitted by an active device, such as a diode, a vertical cavity surface emitting laser (VCSEL), or the like, that may be disposed on either or both of the first and second components of the optical device.

The method may comprise a step of forming, on at least one of the plurality of spacer elements and/or on the first substrate and/or second substrate, an optical element.

For example, the optical element may be a lens, a micro-lens array, a metalens, a diffraction grating, a diffuser, a Fresnel lens, an interference filter, or the like. The optical element may be configured to function as a waveguide. The optical element may be configured to increase an optical gain of the optical device.

The method may comprise a step of forming, on at least one of the plurality of spacer elements and/or on the first substrate and/or second substrate, an electrical circuit.

The circuit may comprise passive and/or active components. For example, such a circuit may comprise components such as one or more capacitors, resistors and/or inductors. Such a circuit may comprise an integrated circuit.

Beneficially, by implementing circuitry on at least one of the plurality of spacer elements and/or on the first substrate and/or second substrate, additional functionality may be added to an optical device in an efficient and low-cost manner. By implementing such circuitry on the spacer, the first and/or second component may be made smaller, thus resulting in a more compact and low-cost optical device.

The method may comprise a step of forming, on at least one of the plurality of spacer elements and/or on the first substrate and/or second substrate, a layer of radiation-absorbent material. For example, the radiation-absorbent material may be absorbent to wavelengths of radiation that are emitted by an active device, such as a diode, a vertical cavity surface emitting laser (VCSEL), or the like, that may be disposed on either or both of the first and second components of the optical device.

According to a second aspect of the disclosure, there is provided a spacer manufactured according to the method of the first aspect.

According to a third aspect of the disclosure, there is provided a spacer for spacing apart and electrically coupling first and second components of an optical device, the spacer comprising: a first substrate coupled to each of a plurality of spacer elements; and a second substrate coupled to each of the plurality of spacer elements, such that the plurality of spacer elements are disposed between opposing surfaces of the first and second substrates. At least one of the plurality of spacer elements comprises a conductive coating and/or is coupled to the first and second substrates with an electrically-conductive material, such that an electrically-conductive path is formed for electrically coupling the first and second components of the optical device.

Each spacer element may be a bar. At least one of each spacer element and/or the first and/or second substrate may be formed from an electrically-insulating material.

The electrically-conductive material may be formed from a cured electrically-conductive adhesive. The electrically-conductive material may comprise a metal, such as chromium.

At least one of the plurality of spacer elements may comprise a layer of substantially reflective material.

At least one of the plurality of spacer elements may comprise an aperture.

At least one of the plurality of spacer elements may comprise an optical element.

At least one of the plurality of spacer elements may comprise an electrical circuit.

At least one of the plurality of spacer elements may comprise a layer of radiation-absorbent material.

According to a fourth aspect of the disclosure, there is provided a method of assembling an optical device, the method comprising the steps of: adhering a first component of an optical device to a spacer formed according to the method of the first aspect; and adhering a second component of the optical device to the spacer, such that the conductive path of the spacer electrically couples a first conductive element formed on the first component to a second conductive element formed on the second component.

The first and/or second component may be a substrate, a printed circuit board (PCB) or the like. The first and/or second component may be adhered using a conductive adhesive. Such a conductive adhesive may continue, e.g. extend, the conductive path of the spacer to one or more conductive elements on the first and/or second component.

According to a fifth aspect of the disclosure, there is provided an optical device assembled according to the method of the fourth aspect.

The first component may comprise at least one passive optical element.

The second component may comprise at least one active optical element.

The at least one passive optical element may comprise one of: a lens; a microlens array; a metalens; a diffraction grating; a diffuser; a Fresnel lens; a filter; a waveguide.

The at least one active optical element may comprises a sensor and/or an emitter. For example, the emitter may be a laser diode, an LED, a VCSEL or the like. The sensor may comprise a photodiode, a single-photon avalanche detector, or the like The first component may comprise an electrical trace for an eye-safety circuit.

The optical device may be one of: an illuminator; a proximity sensor; a spectral sensor; an ambient light sensor; a dot-projector; a light-to-frequency sensor.

According to a sixth aspect of the disclosure, there is provided an apparatus comprising: at least one optical device according to the fifth aspect; a camera; and processing circuitry communicably coupled to the at least one optical device and to the camera.

The apparatus may be one of: a cellular telephone; a tablet device; or a personal computer.

The above summary is intended to be merely exemplary and non-limiting. The disclosure includes one or more corresponding aspects, embodiments or features in isolation or in various combinations whether or not specifically stated (including claimed) in that combination or in isolation. It should be understood that features defined above in accordance with any aspect of the present disclosure or below relating to any specific embodiment of the disclosure may be utilized, either alone or in combination with any other defined feature, in any other aspect or embodiment or to form a further aspect or embodiment of the disclosure.

BRIEF DESCRIPTION OF THE PREFERRED EMBODIMENTS

These and other aspects of the present disclosure will now be described, by way of example only, with reference to the accompanying drawings, wherein.

Figure 4:
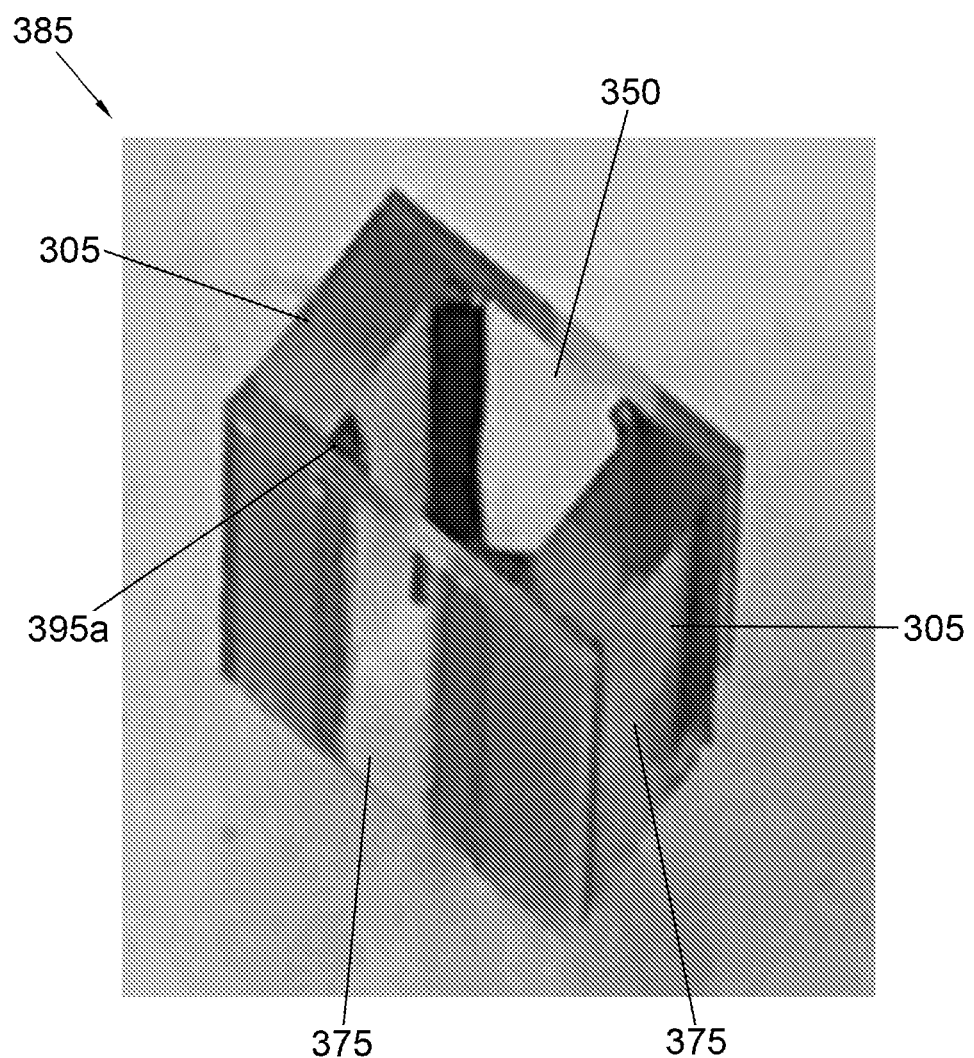
Figure 5A:
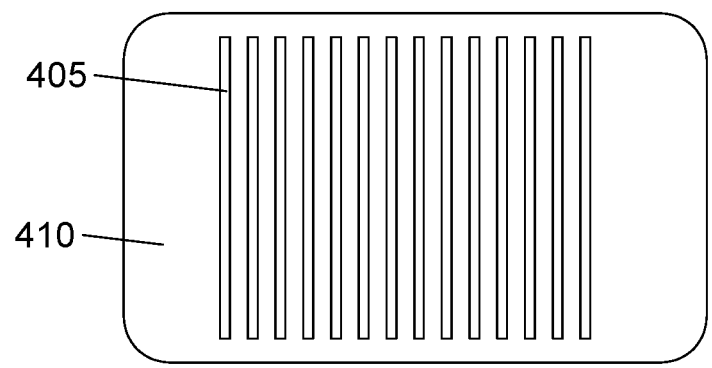
Figure 5B:
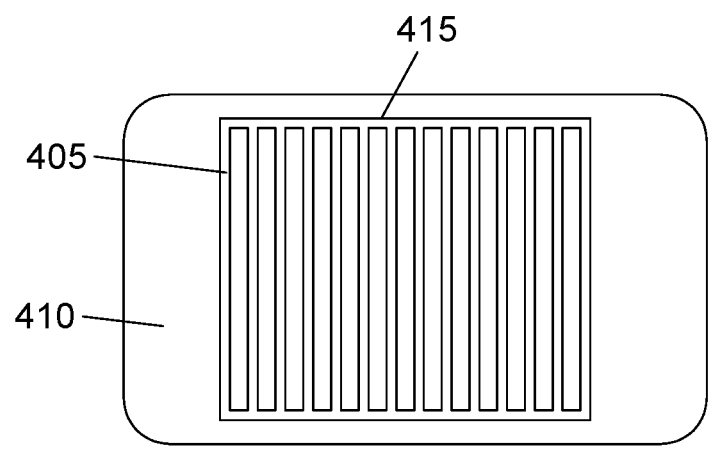
Figure 6:
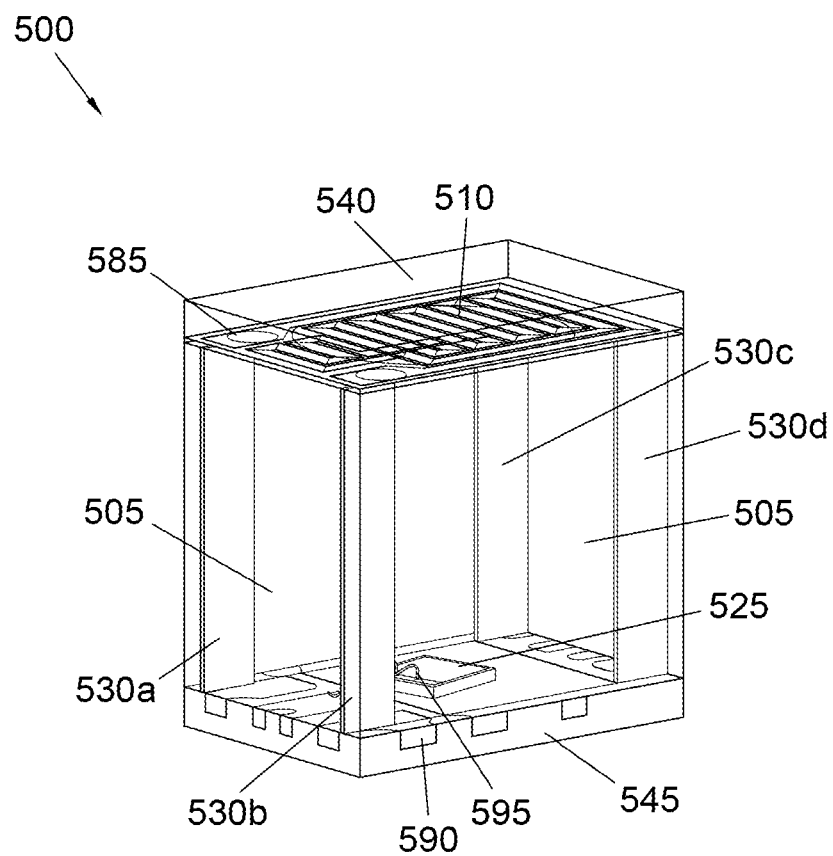
Figure 7:
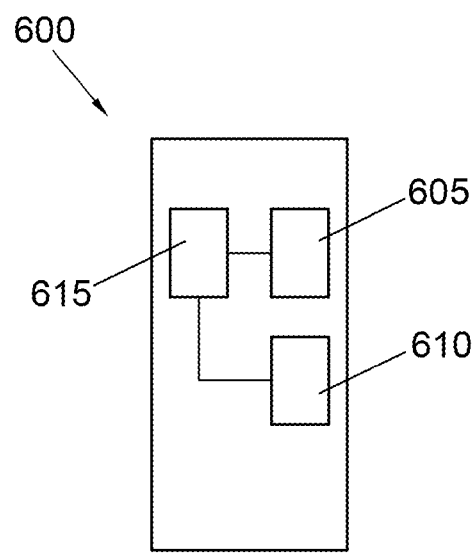
Figure 8:
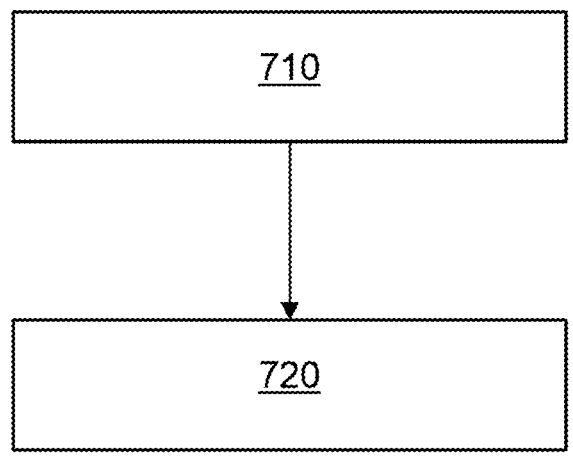
Figure 9:
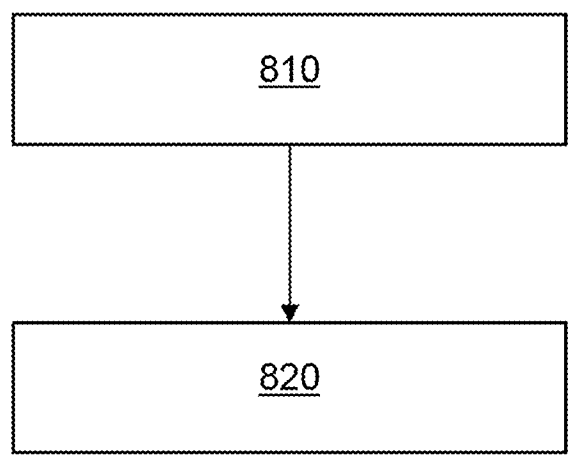

FIG. 4 a photograph of a spacer according to an embodiment of the disclosure;

FIG. 5a depicts a plan view of the plurality of spacer elements arranged on the receptacle;

FIG. 5b depicts another plan view of the plurality of spacer elements arranged on the receptacle;

FIG. 6 depicts an optical device according to an embodiment of the disclosure;

FIG. 7 depicts an apparatus implementing an optical device according to an embodiment of the disclosure;

FIG. 8 a method of manufacturing a spacer for spacing apart and electrically coupling first and second components of an optical device, according to an embodiment of the disclosure; and FIG. 9 a method of assembling an optical device according to an embodiment of the disclosure.

DETAILED DESCRIPTION

Figure 1:
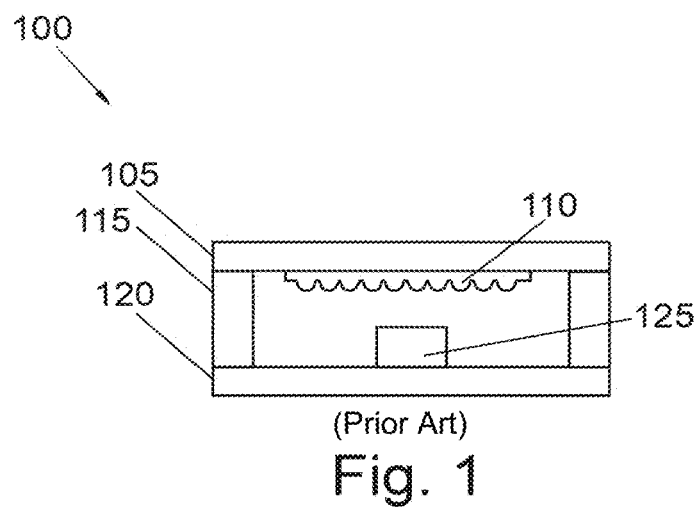
FIG. 1 depicts a prior art optical device.

FIG. 1 depicts a simplified, cross-sectional view of a prior art optical device 100.

The optical device 100 comprises a substrate 105, such as a glass or silicon substrate. An optical element 110 is formed or mounted on the substrate 105. For example, the optical element 110 may be a microlens array, a metalens, or the like.

A circuit, or other electrically-conductive element (not shown) may be formed on the substrate 105.

The optical device 100 comprises a further substrate 120, such as a glass or silicon substrate.

For purposes of example, an active device 125 is depicted mounted on the further substrate 120. The active device 125 may be a laser diode, an LED, a sensor or the like.

The prior art optical device 100 also comprises a spacer 115. The spacer 115 may be formed from a hole, void or bore formed in a substrate. The spacer 115 may be suitable for mounting on the further substrate 120 such that the active device 125 is located within the hole, void or bore.

In some instances, it may be required to provide electrical connectivity between the substrate 105 and the further substrate 120. In such prior art optical devices, the electrical connectivity may be realized by implementing intricate geometries of components and/or complex processes, such as Laser Direct Structuring (LDS) and/or implementation of additional components.

FIGS. 2a to 2i depict series of steps for manufacturing a spacer for spacing apart and electrically coupling first and second components of an optical device, according to an embodiment of the disclosure.

Figure 2A:
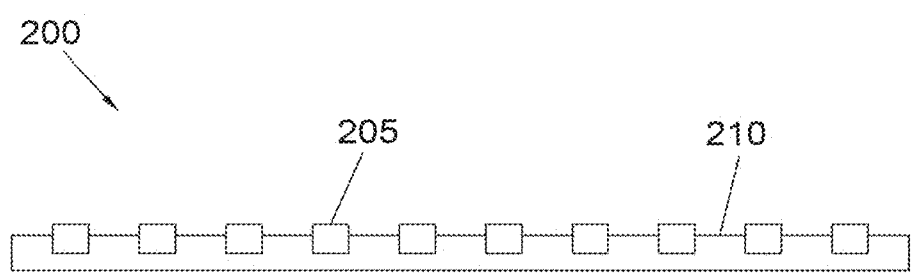
FIG. 2a depicts a step of step of arranging the plurality of spacer elements on a receptacle.

FIG. 2a depicts a step 200 of arranging a plurality of spacer elements 205 on a receptacle 210. FIG. 2a is a cross-sectional view. In some embodiments, each spacer element 205 is an elongate element, such as a bar. As such, the step 200 may comprise arranging the plurality of spacer elements 205 substantially parallel to one another on the receptacle 205.

The receptacle 210 may be a baseplate, a wafer plate, or the like. The example receptacle 210 as depicted in FIG. 2a comprises a plurality of troughs, each trough sized to accommodate a spacer element 205. As such, each trough may inhibit or limit movement of the plurality of spacer elements 205 during assembly of the spacer 285.

The receptacle 210 may be a chuck. The receptacle 210 may comprise additional components (not shown) configured to hold or clamp the plurality of spacer elements 205. In an example embodiment, the receptacle 210 is a vacuum chuck.

Figure 2B:
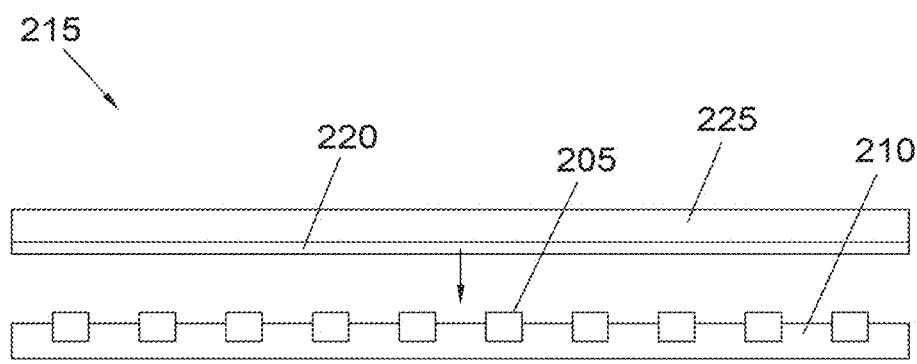
FIG. 2b depicts a step of adhering a removable adhesive element to the plurality of spacer elements.

FIG. 2b depicts a step 215 of adhering a removable adhesive element 220 to the plurality of spacer elements 205. The removable adhesive element 220 may comprise a sheet of dicing tape. In an example embodiment, the removable adhesive element 220 comprises double-sided tape, e.g. a tape with adhesive applied to both sides. A first side of the removable adhesive element 220 is depicted as adhered to a carrier element 225. The carrier element 225 may be a baseplate or the like. The step 215 of FIG. 2b comprises adhering a second side of the removable adhesive element 220 to the plurality of spacer elements 205. As such, the carrier element 225 may be used to lift the plurality of spacer elements 205 from the receptacle 210, as depicted in FIG. 2c.

Figure 2C:
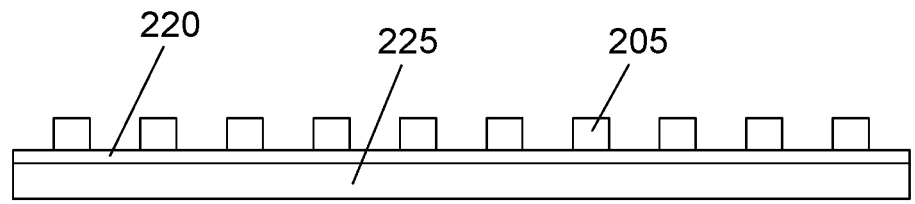
FIG. 2c depicts the plurality of spacer elements adhered to the removable adhesive element.

Furthermore, in an optional step depicted in FIG. 2c, the carrier element 225 has been rotated such that the plurality of spacer elements 205 extend in an upwards direction from the removable adhesive element 220 and the carrier element 225.

Figure 2D:
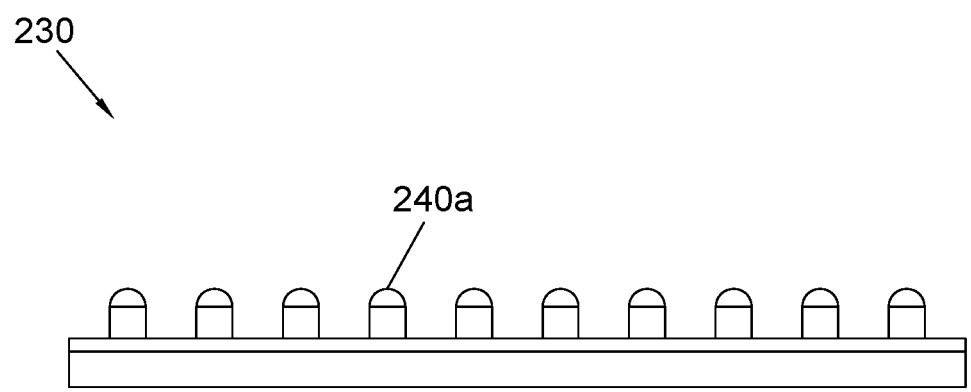
FIG. 2d depicts a step of dispensing adhesive on each element of the plurality of spacer elements.

FIG. 2d depicts a step 230 of dispensing an electrically-conductive adhesive 240a on each of the plurality of spacer elements 205.

The electrically-conductive adhesive 240a may, for example, be dispensed as a liquid, gel or paste or the like.

The electrically-conductive adhesive 240a may be provided as a suspension of conductive filaments or elements. The electrically-conductive adhesive 240a may be an isotropic conductive adhesive.

The step 230 of dispensing the electrically-conductive adhesive 240a on each of the plurality of spacer elements 205 may comprise screen-printing. The step of dispensing the electrically-conductive adhesive 240a may comprise jetting.

The electrically-conductive adhesive 240a may be dispensed as droplets or beads on each spacer element 205.

Figure 2E:
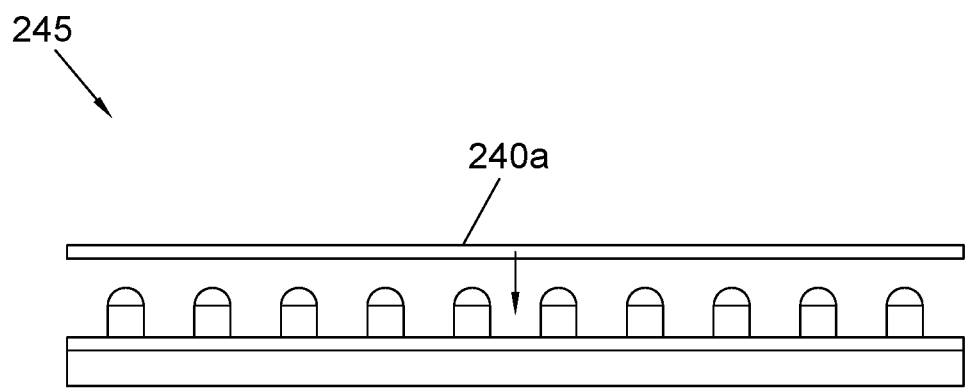
FIG. 2e depicts a step of adhesively coupling a first substrate to each of the plurality of spacer elements.

FIG. 2e depicts a step 245 of adhesively coupling a first substrate 250 to each of the plurality of spacer elements 205. The first substrate 250 is lowered in a direction denoted by arrow 255 onto the electrically-conductive adhesive 240a, thus adhering the first substrate 250 to each of the plurality of spacer elements 205.

The step 245 may comprise applying a force to the first substrate 250 when adhesively coupling the first substrate 250 to the plurality of spacer elements 205, such that a portion of the electrically-conductive adhesive 240a is pushed or forced from between the first substrate 250 and the plurality of spacer elements 205, as will be described in more detail with reference to FIGS. 3 and 4.

The electrically-conductive adhesive 240a may be cured, such as thermally and/or UV cured to harden the electrically-conductive adhesive 240a.

Figure 2F:
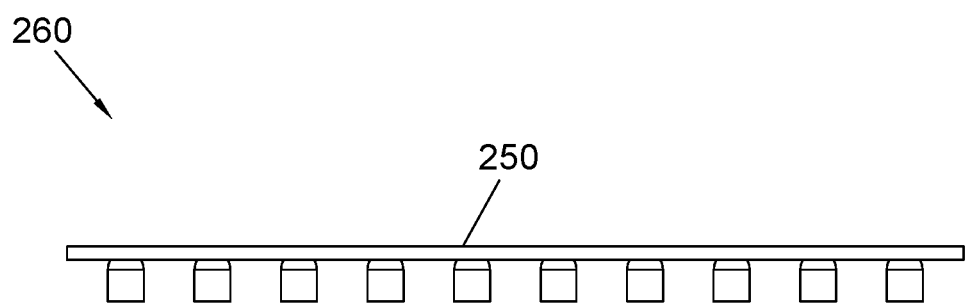
FIG. 2f depicts a step of removing the removable adhesive element.

At a step 260 depicted in FIG. 2f, the removable adhesive element 220 is separated from the plurality of spacer elements 205. The step of curing the electrically-conductive adhesive 240a may also, to at least some extent, decrease an adhesion of the removable adhesive element 220, and hence ease its removal without applying undue forces to the first substrate 250 and/or the plurality of spacer elements 205.

Figure 2G:
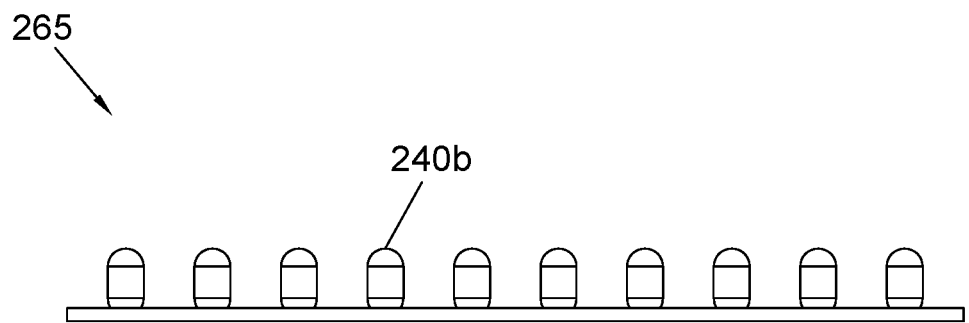
FIG. 2g depicts a further step of dispensing adhesive on each element of the plurality of spacer elements.

FIG. 2g depicts a step 265 of dispensing electrically-conductive adhesive 240b on each of the plurality of spacer elements 205. Features of the electrically-conductive adhesive 240b, and methods of application are described above with respect to the electrically-conductive adhesive 240a of FIG. 2d.

Figure 2H:
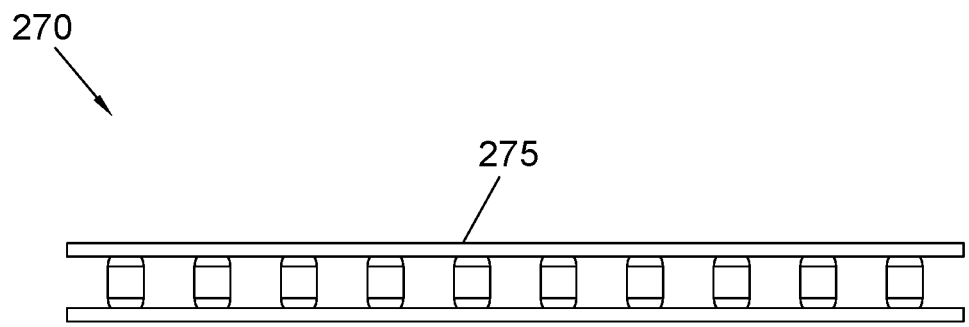
FIG. 2h depicts a step of adhesively coupling a second substrate to each of the plurality of spacer elements.

FIG. 2h depicts a step 270 of adhesively coupling a second substrate 275 to each of the plurality of spacer elements 205. The second substrate 275 may be a glass substrate, a silicon substrate, or the like.

The second substrate 275 is placed onto the electrically-conductive adhesive 240b, thus adhering the second substrate 275 to each of the plurality of spacer elements 205.

The step 270 may comprise applying a force to the second substrate 275 when adhesively coupling the second substrate 275 to the plurality of spacer elements 205, such that a portion of the electrically-conductive adhesive 240b is pushed or forced from between the second substrate 275 and the plurality of spacer elements 205, as will be described in more detail with reference to FIGS. 3 and 4.

The electrically-conductive adhesive 240b may subsequently be cured, such as thermally and/or UV cured, to harden the electrically-conductive adhesive 240b.

Figure 2I:
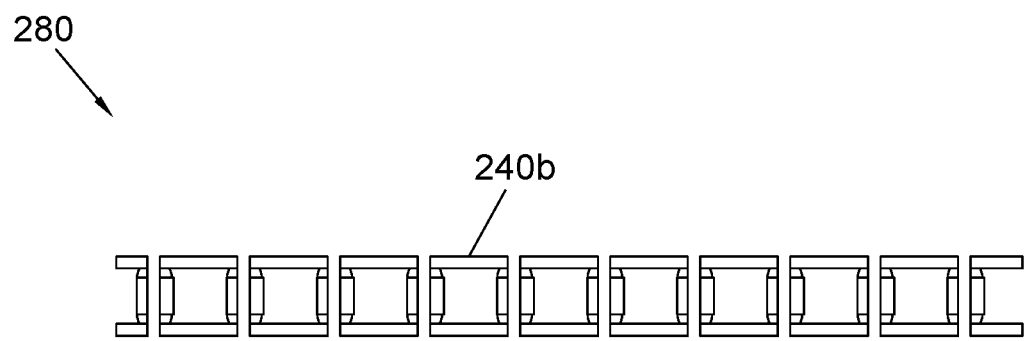
FIG. 2i depicts a step of dicing an assembled first substrate, second substrate and plurality of spacer elements to form a plurality of spacers.

FIG. 2i depicts a step 280 of dicing an assembled first substrate 250, second substrate 275 and plurality of spacer elements 210 to form a plurality of spacers 285. Step 280 may comprise using a dicing saw, laser cutter, or the like. Each spacer element of the plurality of spacer elements 210 is cut into separate parts, each part forming a sidewall of a separate spacer 285 of the plurality of spacers. In some example embodiments, after to the step 280 of dicing, each part forming the sidewall of the separate spacer 285 may be polished.

Figure 3:
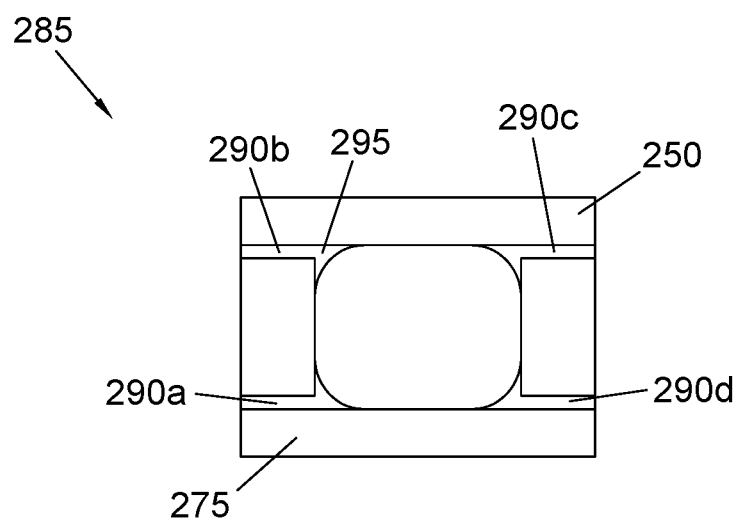
FIG. 3 depicts a spacer according to an embodiment of the disclosure.

FIG. 3 depicts an example of the spacer 285. The spacer 285 is formed from a diced portion of a first substrate 250, a diced portion of a second substrate 275, and two diced portions of spacer elements 205. The electrically-conductive adhesive 240a, 240b described above with reference to FIGS. 2d and 2g is hardened to form conductive paths 290a, 290b, 290c, 290d. The conductive paths 290a, 290b, 290c, 290d are suitable for electrically coupling a first component 540 and a second component 545 of an optical device 500, as described in more detail below with reference to FIG. 6.

Also depicted in FIG. 3 is a portion 295a of the conductive paths 290a that is formed by a portion of the electrically-conductive adhesive 240a being pushed or forced from between the first and second substrates 250, 275 and the plurality of spacer elements 205, as described above. Beneficially, the portion 295a of the conductive paths 290a increases an overall cross-sectional area of the conductive path 290a, decreasing an overall resistance of the conductive path 290a.

FIG. 4 is a photograph of a spacer 385 according to an embodiment of the disclosure. The spacer 385 is formed from a diced portion of a first substrate 350, a diced portion of a second substrate 375, and two diced portions of spacer elements 305. The electrically-conductive adhesive 240a, 240b described above with reference to FIGS. 2d and 2g is hardened to form conductive paths 390a, 390b, 390c, 390d. The conductive paths 390a, 390b, 390c, 390d are suitable for electrically coupling a first component 540 and a second component 545 of the optical device 500, as described in more detail below with reference to FIG. 6.

Also depicted in FIG. 4 is a portion 395a of the conductive paths 390a that is formed by a portion of the electrically-conductive adhesive 240a being pushed or forced from between the first and second substrates 350, 375 and the plurality of spacer elements 305, as described above.

FIG. 5 depicts a plan view of a plurality of spacer elements 405 arranged on a receptacle 410. FIG. 5 is an example of a plan view of a receptacle 210 and spacer elements 205 corresponding to that depicted in FIG. 2a.

It can be seen that each spacer element 405 is an elongate element, and is generally shaped as a bar. In an example embodiment, each spacer element 405 is formed from a diced substrate or wafer. After dicing, each spacer element 405 is disposed in a trough or groove in the receptacle 410, as described above in step 200.

In order to ease handling of a plurality of spacer elements 405, in particular when placing and/or removing the spacer elements 405 from the receptacle 410, one or more supports 415 may be coupled to the plurality of spacer elements 405, as depicted in FIG. 5b.

The above-described methods may also comprise a step of forming on at least one of the plurality of spacer elements 205 and/or on the first substrate 250 and/or second substrate 275, a layer of material. Such a layer may be formed at any suitable stage of the method. For example, in some embodiment, such a coating or layer may be formed on the first substrate 250 and/or second substrate 275 before step 200.

In some embodiments, such a coating or layer may be formed on a substrate before the substrate is diced or cut to form the plurality of spacer elements 205. In some embodiments, such a coating or layer may be formed on at least one of the plurality of spacer elements 205 after such dicing or cutting.

The layer of material may be reflective to wavelengths of radiation that may be emitted by an active device 525, as depicted in FIG. 6.

The layer of material may be a layer of radiation-absorbent material. For example, the radiation-absorbent material may be absorbent to wavelengths of radiation that are emitted by an active device, such as active device 525.

The above-described methods may also comprise a step of forming on at least one of the plurality of spacer elements 205 and/or on the first substrate 250 and/or second substrate 275, an electrically-conductive layer or coating.

Furthermore, in some embodiments wherein an electrically-conductive layer or coating is formed on at least one of the plurality of spacer elements 205 and/or on the first substrate 250 and/or second substrate 275, the adhesive used for coupling the spacer elements 205 to the first and second substrates 250, 275 may be a non-conductive adhesive.

Such an electrically-conductive layer or coating may be formed by a process of a process of thin film deposition and/or by printing. Such an electrically-conductive layer or coating may comprise a metal such as chromium. Such an electrically-conductive layer or coating may be formed from a transparent conducting film, such as a transparent conducting oxide. In an embodiment, the electrically-conductive layer or coating comprises indium tin oxide.

FIG. 6 depicts an optical device 500 according to an embodiment of the disclosure. FIG. 6 depicts how a spacer 535 manufactured according to the above-described methods may be used to assemble the optical device 500.

The optical device 500 is formed from a first component 540 and a second component 545 spaced apart and conductively coupled by a spacer 535. The spacer 535 may be a spacer manufactured according to the above-described method of FIGS. 2a to 2i. That is, the spacer 535 comprises spacer elements 505 coupled to first and second substrates.

In the example of FIG. 6, the first component 540 comprises an optical element 510. The optical element 510 is a lens. It will be appreciated that in embodiments, the optical element 510 may be a microlens array, a metalens, a diffraction grating, a diffuser, a Fresnel lens, an interference filter, or the like.

Also depicted is an eye-safety circuit 585 formed on the first component 540. The eye-safety circuit 585 comprises a conductive trace that extends around the optical element 510.

In the example of FIG. 6, the second component 545 is a printed circuit board. It will be appreciated that in embodiments, the second component 545 may be a substrate, such as a glass or silicon substrate.

Also depicted is an active device 525 mounted on the second component 545. In this example embodiment, the active device 525 comprises a radiation emitter, such as an infrared radiation source. The active device 525 is electrically coupled to the second component 545 by bond wires 595.

The second component 545 comprises a plurality of conductive contacts 590. The plurality of conductive contacts 590 comprises contacts for coupling to the active device 525, e.g. using the bond wires 595. The plurality of conductive contacts 590 comprises contacts for coupling the optical device 500 to a further circuit or apparatus.

In the example of FIG. 6, the spacer elements 505 comprises a conductive layer 530a, 530b, 530c, 530d. The conductive layer 530a, 530b, 530c, 530d provides a conductive path extending from the first component 540 to the second component 545.

As such, in some embodiments a conductive path extending from the first component 540 to the second component 545 may be formed by conductive layers formed on the spacer elements as exemplified in FIG. 6. Additionally, or alternatively, a conductive path extending from the first component 540 to the second component 545 may be formed by use of an electrically-conductive adhesive when assembling the spacer 585, as shown above in FIGS. 3 and 4 and described above with reference to the method of FIGS. 2a to 2i.

Continuing with the example embodiment of FIG. 6, a complete circuit may be formed by the eye-safety circuit 585 electrically coupled to the plurality of conductive contacts 590 and/or the active device 525 via the conductive layers 530a, 530b, 530c, 530d in the spacer 535.

As an example, dimensions of such an optical device 500, a height, e.g. a distance from the first component 540 to the second component 545, may be in the region of 2 mm to 5 mm. Similarly, lateral dimensions of the first component 540 and the second component 545 may be approximately 2 mm to 5 mm by 2 mm to 4 mm.

The example optical device 500 is an illuminator, e.g. an infrared illuminator, for eye-safety applications. In other embodiments, an optical device comprising the disclosed spacer may be, for example, a proximity sensor; a spectral sensor; an ambient light sensor; a dot-projector; a light-to-frequency sensor, or the like.

FIG. 7 depicts an example apparatus 600 according to an embodiment of the disclosure. The example apparatus 600 may be a smart-phone, a tablet device, or the like. The apparatus 600 comprises an optical device 610 according to an embodiment of the disclosure. That is, the optical device 610 may be, or may comprise, an optical device 500 as manufactured according to the method described above with reference to FIGS. 2a to 2i.

The apparatus 600 also comprises an imaging device which, in some embodiments, may be a camera 605.

The apparatus 600 comprises processing circuitry 615 communicably coupled to the optical device 610 and to the camera 605.

In one embodiment, the optical device 610 may be a component of an infrared illuminator for use in conjunction with the camera 605, for example for determining a focus of the camera and/or for object recognition and/or proximity detection.

FIG. 8 depicts a method of manufacturing a spacer for spacing apart and electrically coupling first and second components of an optical device, according to an embodiment of the disclosure. In a first step 710, a first substrate is adhesively coupled to each of a plurality of spacer elements.

In a second step 720, a second substrate is adhesively coupled to each of the plurality of spacer elements, such that the plurality of spacer elements are disposed between opposing surfaces of the first and second substrates, wherein at least one of the plurality of spacer elements comprises a conductive coating and/or is adhesively coupled to the first and second substrates with an electrically-conductive adhesive, such that an electrically-conductive path is formed for electrically coupling the first and second components of the optical device.

FIG. 9 depicts a method of assembling an optical device according to an embodiment of the disclosure.

In a first step 810, a first component of an optical device is adhered to a spacer formed according to the method of FIG. 8.

In a second step 820, a second component of the optical device is adhered to the spacer, such that the conductive path of the spacer electrically couples a first conductive element formed on the first component to a second conductive element formed on the second component.

The Applicant discloses in isolation each individual feature described herein and any combination of two or more such features, to the extent that such features or combinations are capable of being carried out based on the specification as a whole in the light of the common general knowledge of a person skilled in the art, irrespective of whether such features or combinations of features solve any problems disclosed herein, and without limitation to the scope of the claims. The applicant indicates that aspects of the disclosure may consist of any such individual feature or combination of features. In view of the foregoing description it will be evident to a person skilled in the art that various modifications may be made within the scope of the disclosure.

Although the disclosure has been described in terms of preferred embodiments as set forth above, it should be understood that these embodiments are illustrative only and that the claims are not limited to those embodiments. Those skilled in the art will be able to make modifications and alternatives in view of the disclosure, which are contemplated as falling within the scope of the appended claims.

Each feature disclosed or illustrated in the present specification may be incorporated in any embodiments, whether alone or in any appropriate combination with any other feature disclosed or illustrated herein.

| List of Reference Numerals | | | |
|---|---|---|---|
| 100 | optical device | 105 | substrate |
| 110 | optical element | 385 | spacer |
| 115 | spacer | 390a | conductive path |
| 120 | further substrate | 390b | conductive path |
| 125 | active device | 390c | conductive path |
| 200 | step | 390d | conductive path |
| 205 | spacer elements | 395a | portion |
| 210 | receptacle | 405 | spacer elements |
| 215 | step | 410 | receptacle |
| 220 | adhesive element | 415 | supports |
| 225 | carrier element | 500 | optical device |
| 230 | step | 505 | spacer elements |
| 240a | electrically-conductive adhesive | 510 | optical element |
| 240b | electrically-conductive adhesive | 525 | active device |
| 245 | step | 530a | conductive layer |
| 250 | first substrate | 530b | conductive layer |
| 255 | arrow | 530c | conductive layer |
| 260 | step | 530d | conductive layer |
| 265 | step | 535 | spacer |
| 270 | step | 540 | first component |
| 275 | second substrate | 545 | second component |
| 275 | step | 585 | eye-safety circuit |
| 280 | step | 590 | conductive contacts |
| 285 | spacer | 595 | bond wires |
| 290a | conductive path | 600 | apparatus |
| 290b | conductive path | 605 | camera |
| 290c | conductive path | 610 | optical device |
| 290d | conductive path | 615 | processing circuitry |
| 295a | portion | 710 | first step |
| 305 | spacer elements | 720 | second step |
| 350 | first substrate | 810 | first step |
| 375 | second substrate | 820 | second step |

The invention claimed is:

1. A method of manufacturing a spacer for spacing apart and electrically coupling first and second components of an optical device, the method comprising the steps of:
adhesively coupling, with a first portion of a conductive adhesive, a first substrate to each of a plurality of spacer elements;
adhesively coupling, with a second portion of the conductive adhesive, a second substrate to each of the plurality of spacer elements, such that the plurality of spacer elements are disposed between opposing surfaces of the first and second substrates; and
dicing the first substrate, the second substrate, and the plurality of spacer elements to form a plurality of spacers, including the first and second portions of the conductive adhesive,
wherein the dicing comprises cutting each spacer element of the plurality of spacer elements into separate parts, each part forming a sidewall of a separate spacer of the plurality of spacers,
wherein the sidewall comprises at least a portion of each of the first substrate, the second substrate, and the plurality of spacer elements, including the first and second portions of the conductive adhesive, and
wherein at least one of the plurality of spacer elements comprises a conductive coating and/or is adhesively coupled to the first and second substrates with an electrically-conductive adhesive, such that an electrically-conductive path is formed for electrically coupling the first and second components of the optical device.

2. The method of claim 1, wherein each spacer element is a bar.

3. The method of claim 1, wherein each spacer element and/or the first and/or second substrate are formed from an electrically-insulating material.

4. The method of claim 1, comprising a preceding step of arranging the plurality of spacer elements substantially parallel to one another on a receptacle.

5. The method of claim 4, comprising a step of adhering a removable adhesive element to the plurality of spacer elements, and subsequently removing the plurality of spacer elements from the receptacle.

6. The method of claim 1, comprising one or more steps of curing the electrically-conductive adhesive to form the electrically-conductive path.

7. The method of claim 1, comprising a step of forming, on at least one of the plurality of spacer elements and/or on the first substrate and/or second substrate, at least one of:
a layer of substantially reflective material;
an optical element;
an electrical circuit;
an aperture; and
a layer of radiation-absorbent material.

8. A spacer manufactured according to the method of claim 1.

9. A spacer for spacing apart and electrically coupling first and second components of an optical device, the spacer comprising:
a first diced portion of a first substrate;
a plurality of diced portions of spacer elements comprising first and second diced portions of cured electrically-conductive adhesive;
a second diced portion of a second substrate coupled to each of the plurality of diced portions of spacer elements, such that the plurality of diced portions of spacer elements are disposed between opposing surfaces of the first and second substrates and in contact with the first and second diced portions of cured electrically-conductive adhesive,
wherein the first substrate, the second substrate, and the plurality of diced portions of spacer elements form a plurality of spacers between the first and second components of optical device, and
wherein each of the plurality of spacers comprises a diced sidewall comprising the first diced portion of the first substrate, one of the plurality of diced portions of spacer elements, and the second diced portion of the second substrate,
wherein the first and second diced portions of cured electrically-conductive adhesive comprise an extended portion of the electrically-conductive adhesive extending outwardly from the diced sidewall, and
wherein at least one of the plurality of spacers comprises a conductive coating and/or is coupled to the first and second substrates with an electrically-conductive material, such that an electrically-conductive path is formed for electrically coupling the first and second components of the optical device, wherein the electrically-conductive path comprises the extended portion.

10. The spacer of claim 9, wherein each spacer element is a bar, and wherein at least one of each spacer element and/or the first and/or second substrate are formed from an electrically-insulating material.

11. The spacer according to claim 9, wherein at least one of the plurality of spacer elements comprises: a layer of substantially reflective material and/or an optical element and/or an electrical circuit and/or a layer of radiation-absorbent material.

12. A method of assembling an optical device, the method comprising the steps of:
adhering a first component of an optical device to a spacer formed according to the method of claim 1; and
adhering a second component of the optical device to the spacer, such that the electrically-conductive path of the spacer electrically couples a first conductive element formed on the first component to a second conductive element formed on the second component.

13. An optical device assembled according to the method of claim 12.

14. An optical device according to claim 13, wherein:
the first component comprises at least one passive optical element; and/or the second component comprises at least one active optical element.

15. The optical device of claim 14, wherein at least one of:
the at least one passive optical element comprises one of: a lens; a microlens array; a metalens; a diffraction grating; a diffuser; a Fresnel lens; a filter; a waveguide;
the at least one active optical element comprises a sensor and/or an emitter; and
the first component comprises an electrical trace for an eye-safety circuit.

16. The optical device of claim 10, wherein the optical device is one of: an illuminator; a proximity sensor; a spectral sensor; an ambient light sensor; a dot projector; a light-to-frequency sensor.

17. An apparatus comprising:
at least one optical device according to any of claim 13;
a camera; and
processing circuitry communicably coupled to the at least one optical device and to the camera.

18. The apparatus of claim 17, wherein the apparatus is one of:
a cellular telephone;
a tablet device; and
a personal computer.

* * * * *